US007980946B2

(12) United States Patent
Marks et al.

(10) Patent No.: US 7,980,946 B2
(45) Date of Patent: Jul. 19, 2011

(54) METHOD OF PLAYING A SLOT MACHINE GAME USING WILDCARD SYMBOLS WITH RANDOMLY DISPLAYED MULTIPLIER VALUES

(75) Inventors: Daniel M. Marks, Cold Spring, NY (US); Anthony M Singer, Ramsey, NJ (US); Howard Mitchell Marks, Scarsdale, NY (US)

(73) Assignee: PTT, LLC, Mahwah, NJ (US)

( * ) Notice: Subject to any disclaimer, the term of this patent is extended or adjusted under 35 U.S.C. 154(b) by 901 days.

(21) Appl. No.: 11/980,286

(22) Filed: Oct. 30, 2007

(65) Prior Publication Data

US 2008/0090644 A1 Apr. 17, 2008

Related U.S. Application Data

(63) Continuation of application No. 11/252,928, filed on Oct. 18, 2005, now Pat. No. 7,530,894.

(60) Provisional application No. 60/619,808, filed on Oct. 18, 2004.

(51) Int. Cl.

| | |
|---|---|
| *A63F 9/24* | (2006.01) |
| *A63F 13/00* | (2006.01) |
| *G06F 17/00* | (2006.01) |
| *G06F 19/00* | (2006.01) |

(52) U.S. Cl. ................ 463/20; 463/13; 463/16; 463/23; 463/25; 273/143 R

(58) Field of Classification Search .................... 463/13, 463/16, 20, 23, 25; 273/143 R
See application file for complete search history.

(56) References Cited

U.S. PATENT DOCUMENTS

| | | | | |
|---|---|---|---|---|
| 6,004,207 | A * | 12/1999 | Wilson et al. | 463/20 |
| 7,121,942 | B2 * | 10/2006 | Baerlocher | 463/20 |
| 2004/0053672 | A1 * | 3/2004 | Baerlocher | 463/20 |
| 2007/0087809 | A1 * | 4/2007 | Baerlocher | 463/16 |

* cited by examiner

*Primary Examiner* — David L Lewis
*Assistant Examiner* — Adetokunbo Torimiro

(57) ABSTRACT

The present invention displays increasing values of two or more wildcard symbols in the symbol matrix. A preferred embodiment called "Up, Up & Way Wilds" displays increasing multiplier values for two or more wildcard symbols used in winning symbol combinations.

9 Claims, 8 Drawing Sheets

UP, UP & AWAY WILDS 2

UP, UP & AWAY WILDS 2

UP, UP & AWAY WILDS 2

UP, UP & AWAY WILDS 2

UP, UP & AWAY WILDS 2

UP, UP & AWAY WILDS 2

UP, UP & AWAY WILDS 2

UP, UP & AWAY WILDS 2

UP, UP & AWAY WILDS 2

METHOD OF PLAYING A SLOT MACHINE GAME USING WILDCARD SYMBOLS WITH RANDOMLY DISPLAYED MULTIPLIER VALUES

PRIORITY CLAIMS AND RELATED APPLICATIONS

This application is a continuation of U.S. Non-Provisional Patent Application Ser. No. 11/252,928, filed on Oct. 18, 2005, which claims priority from U.S. Provisional Patent Application Ser. No. 60/619,808, filed Oct. 18, 2004. All of these applications are incorporated herein by reference.

COPYRIGHT NOTICE

A portion of the disclosure of this patent document contains or may contain material subject to copyright protection. The copyright owner has no objection to the photocopy reproduction of the patent document or the patent disclosure in exactly the form it appears in the Patent and Trademark Office patent file or records, but otherwise reserves all copyright rights.

FIELD OF THE INVENTION

In general, the present invention relates to methods of displaying symbols in a slot machine game and, more particularly, to displaying increasing values of wildcard symbols in the symbol matrix.

BACKGROUND OF THE INVENTION

To play a conventional slot machine, the player deposits money into the machine, sets the wager, spins the reels, and collects awards for winning symbol combinations appearing on selected pay lines, according to a pay schedule. Since conventional slot machines are limited to the foregoing methods, players, casinos, and manufacturers suffer.

Players grow bored of playing games using same method of play; casinos suffer from player dissatisfaction with the casino's game selection; casinos cannot distinguish their games from other casinos; and game manufacturers cannot distinguish their products from other manufacturers.

Slot manufacturers and casino operators, therefore, develop new methods to overcome these limitations. None of these methods, however, display increasing values of wildcard symbols in the symbol matrix. The full potential for slot machine awards, therefore, remains unrealized.

SUMMARY OF THE INVENTION

The present invention displays increasing values of two or more wildcard symbols in the symbol matrix. A preferred embodiment called "Up, Up & Way Wilds" displays increasing multiplier values for two or more wildcard symbols used in winning symbol combinations, as follows:

Each wildcard symbol is randomly assigned a multiplier value, V, from a range of values from 1 to N, such that 1=<V=<N. The multiplier value range depends on the number of wildcard symbols used in winning symbol combinations such that N grows larger with each additional wildcard symbol used in a winning symbol combination.

Each wildcard symbol starts with a displayed multiplier value of 1. One of the wildcard symbols used in a winning combination is activated at random and its displayed multiplier value increments by 1 from 1 to X, such that X<=V.

If a multiplier value increases to the assigned value, X=V, then the wildcard symbol may not be re-activated. If the multiplier value increases to less than the assigned value, X<V, then wildcard symbol may be activated again.

After each wildcard symbol activation, the same symbol may be activated or another wildcard symbol may be activated. Wildcard symbols continue to increase random amounts with each activation until all wildcard symbols used in winning symbol combinations have increased to their assigned values and not be activated.

Once all wildcard symbol display their assigned values, the game issues awards for all winning symbol combinations, including combinations using wildcard symbols. The value of a winning symbol combination using one or more wildcard symbols is multiplied by the additive value of all wildcard symbols used in that combination.

The Up, Up & Away Wilds embodiment only requires that the total number of wildcard symbols used in all winning symbol combinations must be two or more. A winning symbol combination needs only one wildcard symbol provided that at least one other wildcard symbol is used in another winning symbol combination.

BRIEF DESCRIPTION OF THE DRAWINGS

The accompanying figures illustrate various stages of the preferred Up, Up & Away Wilds embodiment of the present invention.

DESCRIPTION OF A PREFERRED EMBODIMENT

Figure 1:
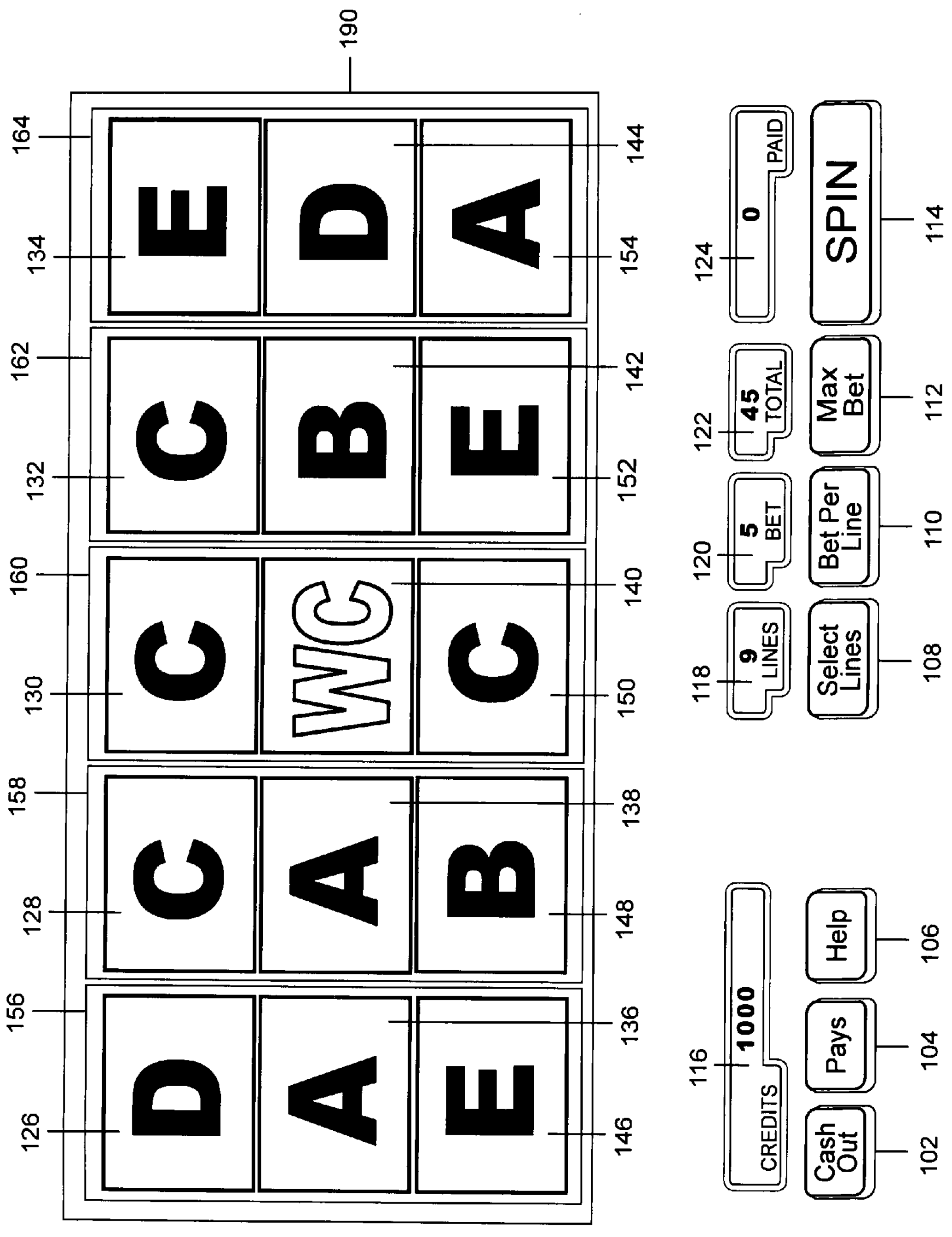
FIG. 1 shows a game screen with one wildcard symbol used in winning symbol combinations.

To play the Up, Up & Away Wilds embodiment, the player initializes credits, sets the wager, spins the reels, collects awards for wining symbol combinations, and collects enhanced awards for winning symbol combinations using wildcard symbols, if two or wildcard symbols are used in winning symbol combinations, as detailed below with reference to FIGS. 1 to 7:

Initialize Credits. In FIG. 1, the player initializes credits by depositing money in the form of coins, gaming tokens or paper currency into a coin head (not shown) or bill acceptor (not shown). Coins and gaming tokens are collected in a reservoir (not shown) inside the gaming machine; paper currency is collected in the bill acceptor (not shown) inside the gaming machine.

If the coins, gaming tokens or paper currency are validated as authentic, the player accrues the appropriate number of playing credits on the Credit meter 116. More credits may be initialized, if necessary, by additional deposits. Alternatively, any method of initializing credits may be used including debit cards, credit cards, smart cards, or other form of electronic funds transfer.

Set the Wager. In FIG. 1, the player sets the wager by selecting pay lines and setting the bet per pay line. The wager is calculated by multiplying the number of selected pay lines by the bet per pay line. For example, the player may wager five credits on each of nine pay lines for a total bet of forty-five credits. The total bet amount is displayed on the Total Bet meter 122.

To select pay lines, the player uses the Select Pay Lines button 108 and views the number of selected pay lines on the Select Pay Lines meter 118. Pay lines are selected in a predetermined order. For example, the first pay line selected is always pay line 1, second pay line selected is always pay line 2, etc. Alternatively, fewer or greater than nine pay lines may be used with any order of pay line activation.

To set the bet per pay line, the player uses the Bet Per Pay Line button 110 and views the amount bet per pay line on the Bet Per Pay Line meter 120. The same amount is wagered on each pay line. For example, up to five credits may be wagered on each pay line. Alternatively, wagers of any amount may be placed on a pay line, with the same or different amount wagered on each pay line.

In addition, the player may use the Bet Max button 112 to place the maximum bet per pay line on all pay lines. Alternatively, any wager may be assigned a button.

Spin the Reels. In FIG. 1, the player uses the Spin button 114 to randomly rearrange the symbols displayed in the symbol matrix 190. The symbol matrix 190 contains three symbol positions for each of the five slot reels 156-164 for a total of fifteen symbol positions 126-154. Alternatively, any number of reels with any number of symbol positions may be used.

The slot reels 156-164 spin and randomly stop one reel at-a-time, from left to right, until all five reels have stopped and all fifteen symbol positions 126-154 of the symbol matrix 190 are revealed. Alternatively, any size symbol matrix may be used and any method may be used to rearrange symbols in the symbol matrix.

Awards. The player receives awards for winning symbol combinations formed by two or more, same, adjacent symbols, starting from the leftmost position of a pay line. A predetermined pay schedule lists the award for each winning symbol combination. Any number of winning symbol combination may be defined, with any amount assigned to each award. For example, the pay schedule may define four "B" symbols as a winning symbol combination with an award of 10× the bet per line. The player may view the pay schedule by using the Pays button 104.

Wildcard Symbols & Awards. In FIGS. 1 to 8, wildcard symbols acts other symbols in the symbol set to help form winning symbol combinations and generate credit awards and enhanced credit awards.

In FIG. 1, only one wildcard symbol 140 is used to help form a winning symbol combination. The wildcard symbol 140 acts as an A symbol to form the winning A-A-A combination 136-140 and generate an award according to a predetermined pay schedule (not shown). The wildcard symbol 140 does not display a multiplier value or enhance the award value in any other manner.

Figure 2:
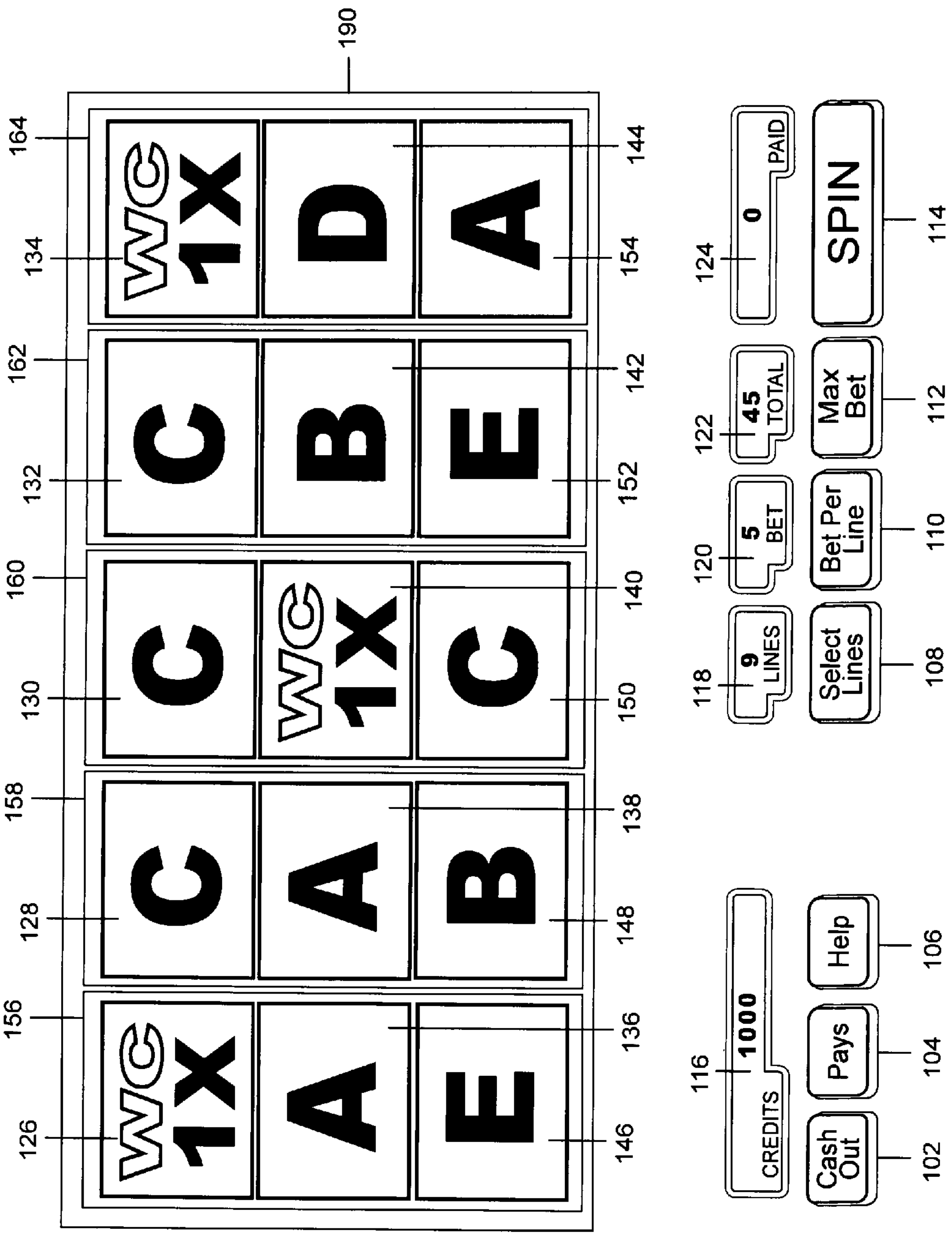
FIG. 2 shows a game screen with three wildcard symbols used in winning symbol combinations.

In FIG. 2, three wildcard symbols 140, 126, 134 are used to help form winning symbol combinations. The first wildcard symbol 140 acts an A symbol to form the winning A-A-A combination 136-140. The second 126 and third 134 wild card symbols act as C symbols to help form the winning C-C-C-C-C combination 126-134. In addition to helping form the winning symbol combinations, the wildcard symbols 140, 126, 134 each display multiplier values that enhance award values.

The assigned multiplier value for each wildcard symbol 140, 126, 134 is randomly selected from a range of values, 3 to 8. The first wildcard symbol 140 is assigned a multiplier value of 5, the second 126 a multiplier value of 7, and the third 134 a multiplier value of 4. None of the assigned multiplier values are shown to the player. Instead, all wildcard symbols 140, 126, 134 initially display the same 1× multiplier value.

The number wildcard symbols used in winning symbol combinations determines the range of possible multiplier values. The chart below provides an example of how the range of multiplier values may change depending on the number of wildcard symbols used in winning symbol combinations:

| Wildcard symbols | Multiplier Value Range |
|---|---|
| 2 | 2 to 5 |
| 3 | 3 to 8 |
| 4 | 5 to 12 |
| 5 or more | 8 to 20 |

Figure 3:
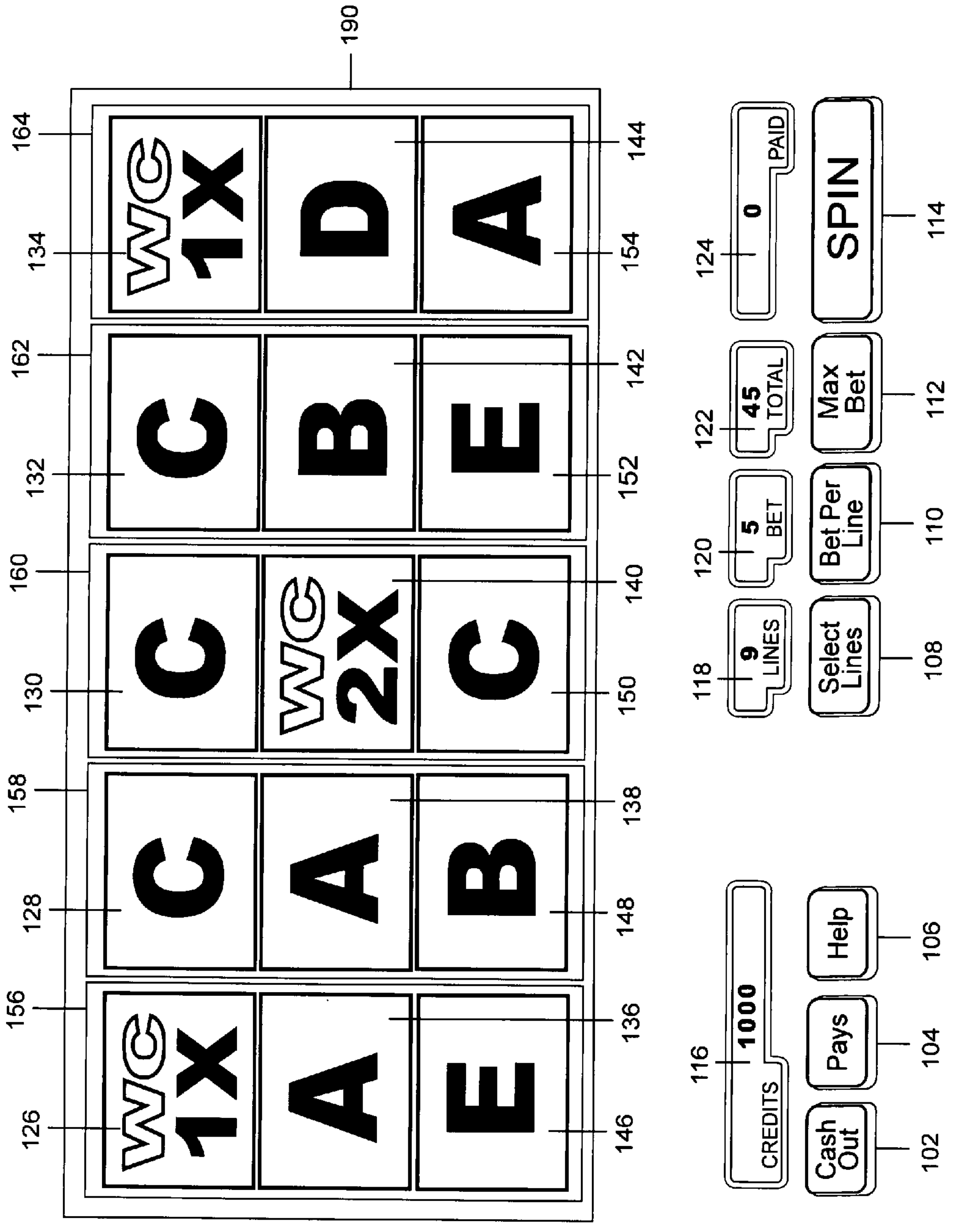
FIG. 3 shows a game screen with a first of three wildcard symbols increasing its displayed multiplier value.

In FIG. 3, a first wildcard symbol 140 is randomly selected from the three wildcard symbols 140, 126, 134 to activate. During activation, a wildcard symbol increases by increments of 1 to a value less than or equal to the assigned multiplier value. Wildcard symbol 140 increases by an increment of 1 from 1× to 2×.

Figure 4:
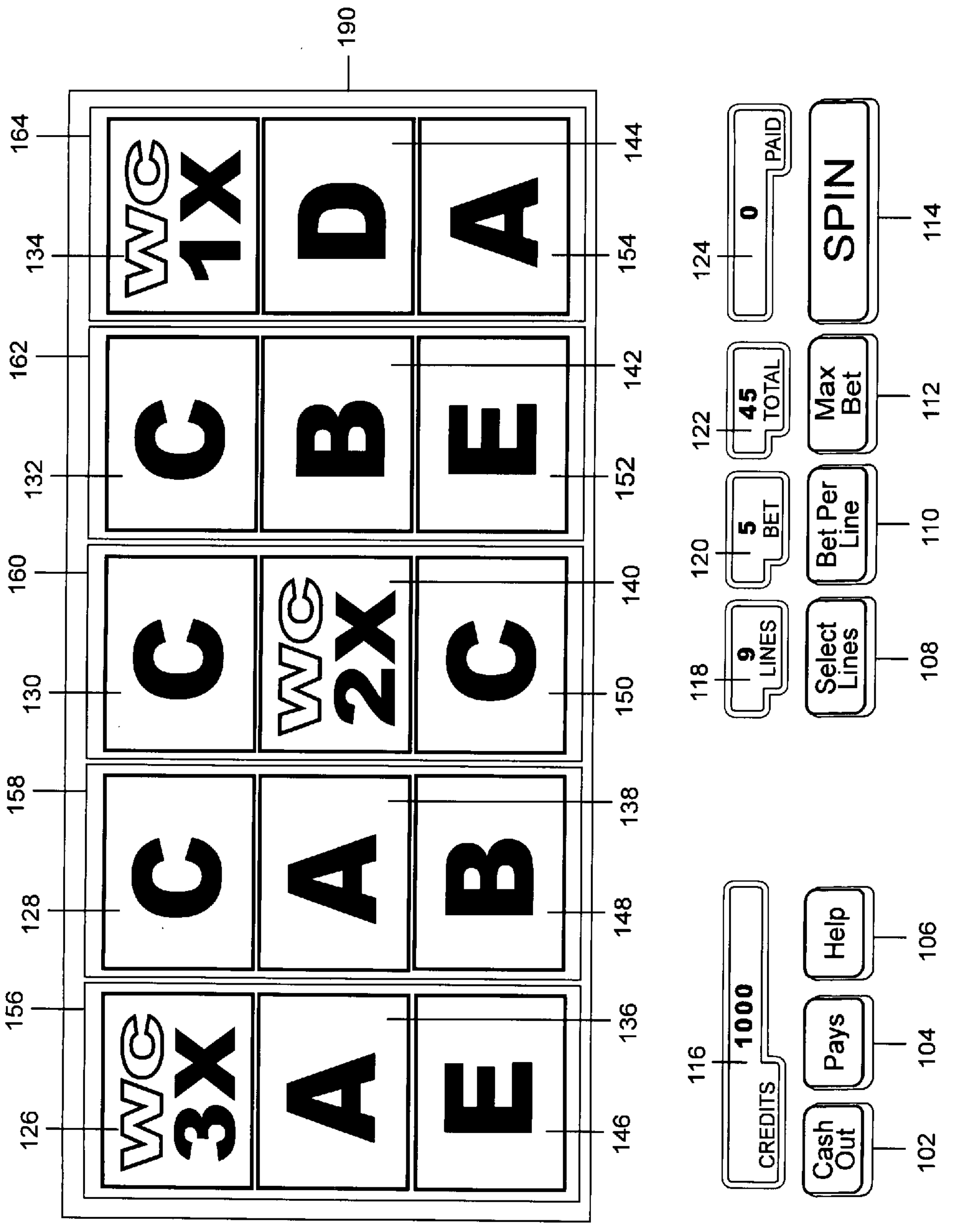
FIG. 4 shows a game screen with a second of three wildcard symbols increasing its displayed multiplier value.

In FIG. 4, a second wildcard symbol 126 is randomly selected from the three wildcard symbols 140, 126, 134 to activate. Any wildcard symbol displaying value less than its assigned value may be activated. Wildcard symbol 126 increases by increments of 1 from 1× to 3×.

Figure 5:
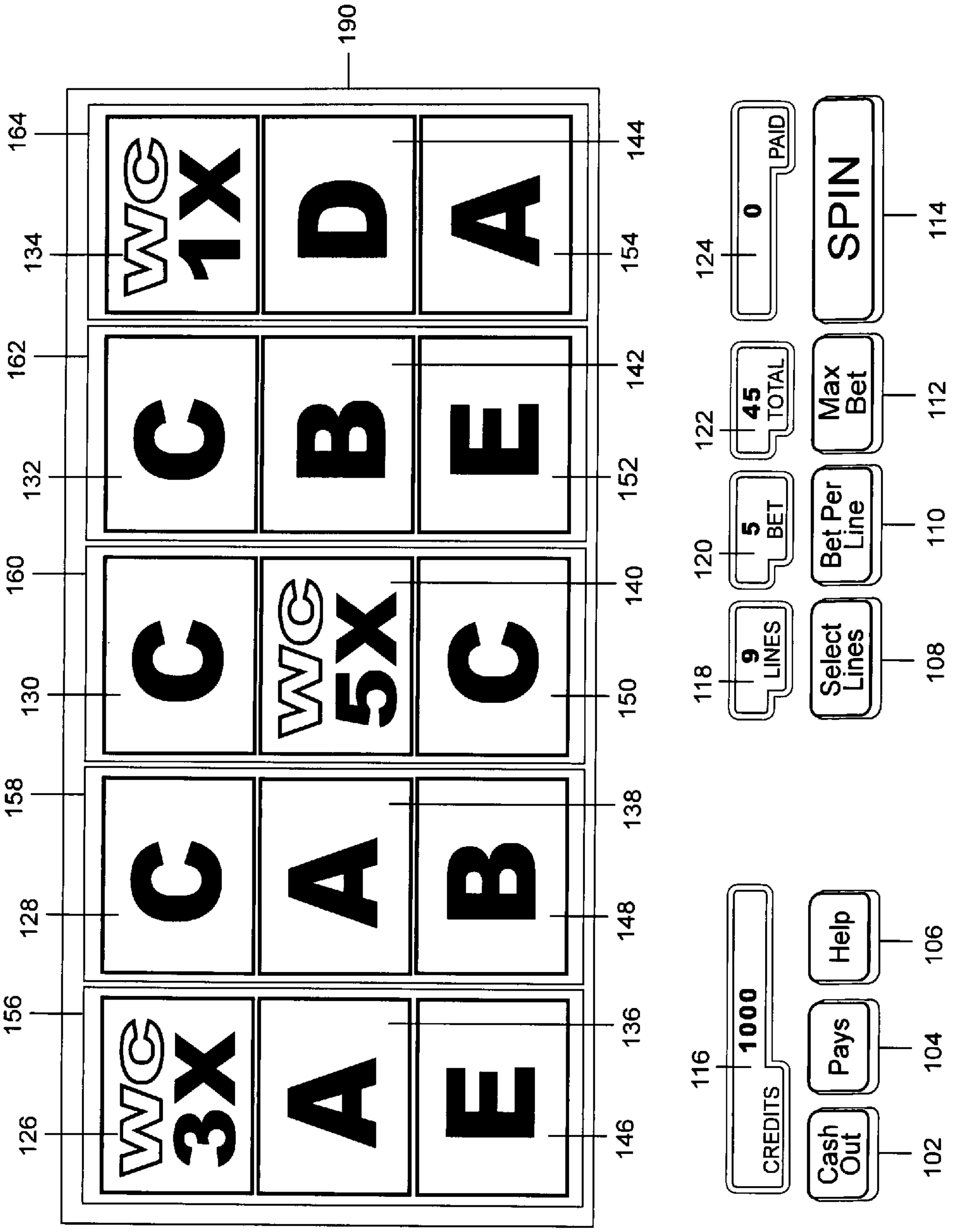
FIG. 5 shows a game screen with the first of three wildcard symbols increasing its displayed multiplier value again.

In FIG. 5, the first wildcard symbol 140 is randomly selected again from the three wildcard symbols 140, 126, 134 to activate. The same wildcard symbol may be increased multiple times before another wildcard symbol is increased once. Wildcard symbol 140 increases by increments of 1 from 2× to 5×.

Figure 6:
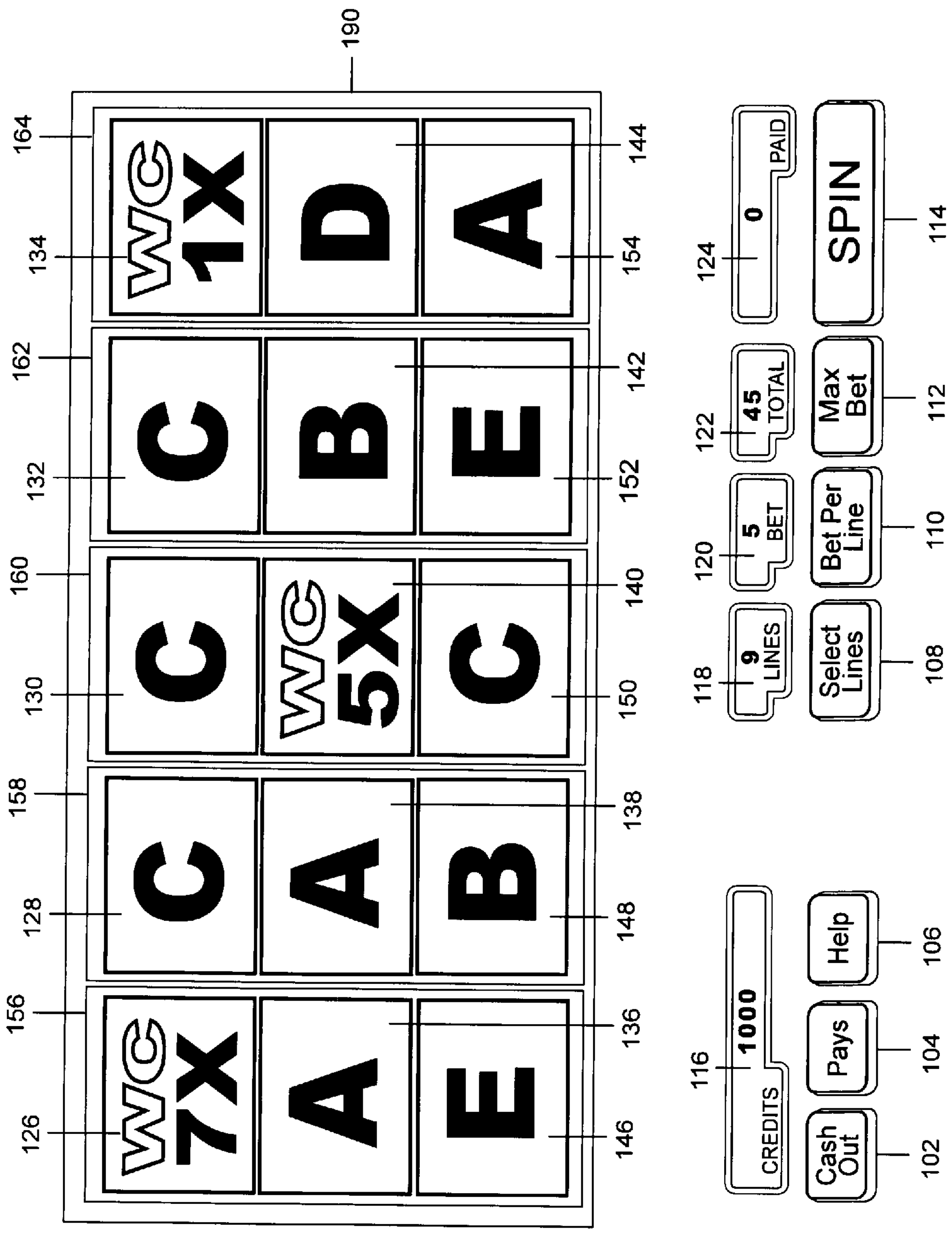
FIG. 6 shows a game screen with the second of three wildcard symbols increasing its displayed multiplier value again.

In FIG. 6, a second wildcard symbol 126 is randomly selected again from two remaining wildcard symbols 126, 134 to activate. The first wildcard symbol 140 may no longer be activated since it displays assigned multiplier value. Wildcard symbol 126 increases by increments of 1 from 3× to 7×.

Figure 7:
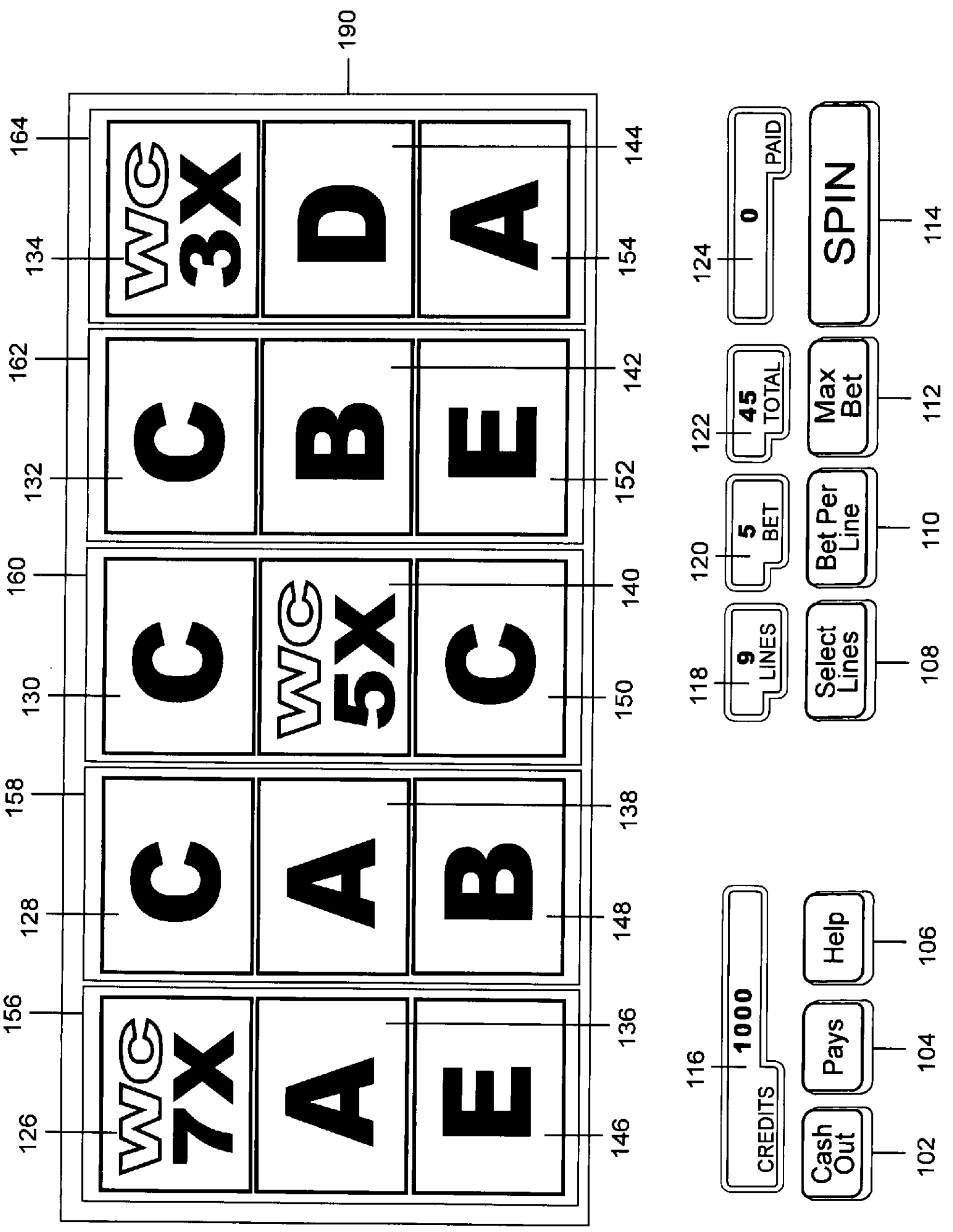
FIG. 7 shows a game screen with a third of three wildcard symbols increasing its displayed multiplier value.

In FIG. 7, a third wildcard symbol 134 is selected as the only remaining wildcard symbol left to activate. The third wildcard symbol 134 is the only wildcard symbol that does not displays its assigned multiplier value. Wildcard symbol 134 increases by increments of 1 from 1× to 3×.

Figure 8:
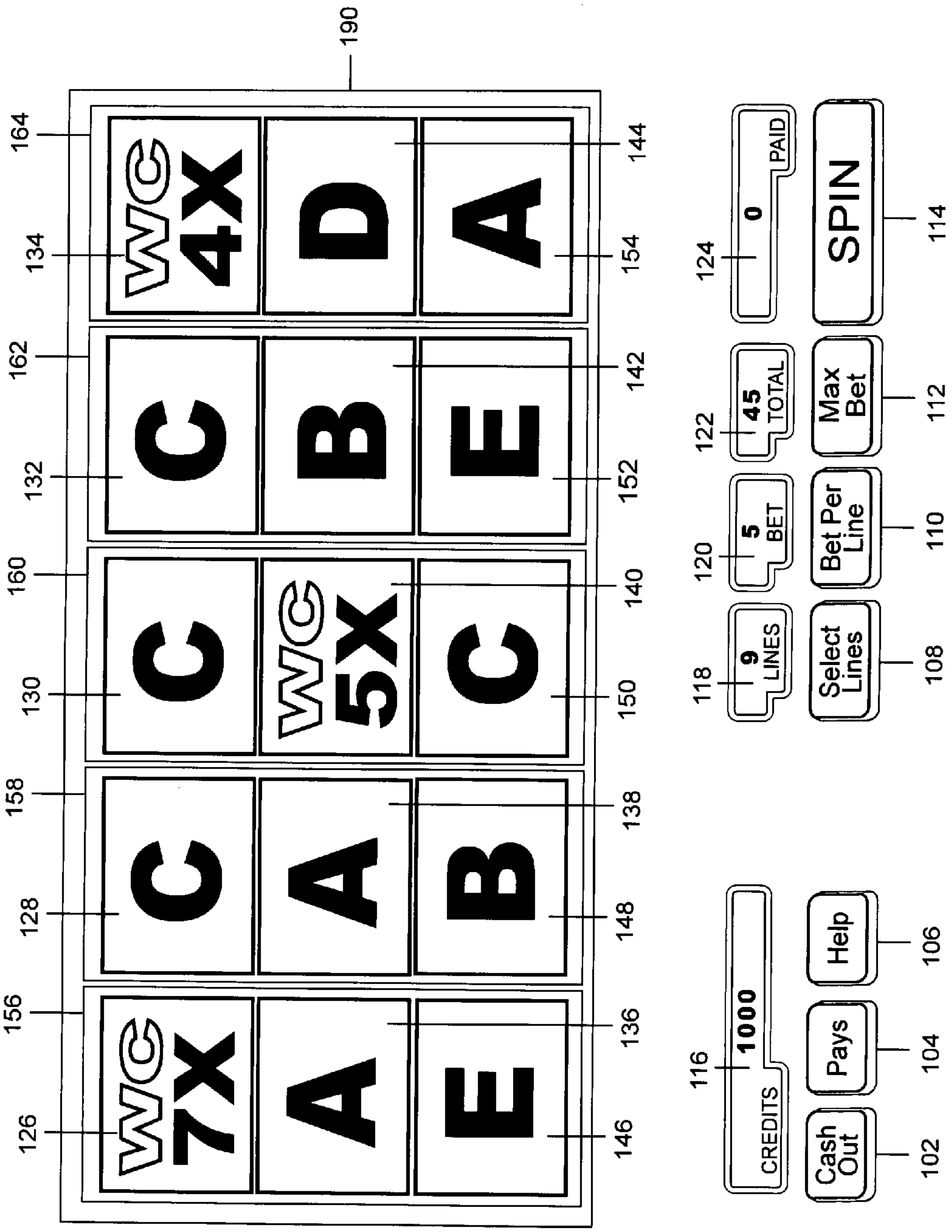
FIG. 8 shows a game screen with a third of three wildcard symbols increasing its displayed multiplier value again.

In FIG. 8, a third wildcard symbol 134 is selected again as the only remaining wildcard symbol to activate. A wildcard symbol may increase, pause for re-selection, and then increase again. Wildcard symbol 134 increases by an increment of 1 from 3× to 4×.

With all of the wildcard symbols 140, 126, 134 displaying their assigned values, the award for each winning symbol combination is enhanced by the additive cumulative values displayed on the wildcard symbols used in that combination:

The award for the A-A-A winning symbol combination 136-140, as specified on the predetermined pay schedule (not shown), is enhanced by the ×5 multiplier value displayed on the lone wildcard symbol used in that combination; and The award for the C-C-C-C-C winning symbol combination 126-134, as specified on the predetermined pay schedule (not shown), is enhanced by the 11× additive cumulative value of the ×7 and ×4 multiplier values displayed on the wildcard symbols used in that combination.

Following issuance of all awards, the cumulative credits are added to the player's balance of credits. As long as the player has credits on the Credit meter 116, the player may continue to play the gaming machine or the player may also collect the balance of credits by pressing the Cash Out button 102. In addition, the player may press the Help button 106 to view the rules of the game.

DESCRIPTION OF ALTERNATIVE EMBODIMENTS

The present invention may be modified in one or more aspects from the Up, Up & Away Wilds embodiment described above, including but not limited to the following:

In one embodiment, the present invention may be triggered by any number of wildcard symbols, such as 3 or more wildcard symbols anywhere in the symbol matrix.

In another embodiment, the present invention may be triggered by any event, such as non-wild card symbol combinations, credits wagered, and/or at random.

In another embodiment, the present invention may assign multiplier values to each wildcard symbol from any range of values, such as a range of values from 1 to 100.

In another embodiment, the present invention may assign multiplier values in accordance with any manner, such as number of non-wild card symbols, credits wagered, and/or at random.

In another embodiment, the present invention may display multiplier values in any location, such as above the wildcard symbol, above each reel, and/or on a second screen display.

In another embodiment, the present invention may display any starting multiplier value for each wildcard symbol, such as half of the assigned multiplier value.

In another embodiment, the present invention may increase the displayed multiplier values by any increment amount, such as by a fixed amount, varying amount, and/or random amount.

In another embodiment, the present invention may require that wildcard symbols increase displayed multiplier values in a predetermined order, such as from left to right across the symbol matrix.

In another embodiment, the present invention may require that wildcard symbols increase displayed multiplier values a limited number of times, such as a maximum of 4 times whether or not the assigned value is reached.

In another embodiment, the present invention may require that wildcard symbols increase displayed multiplier values a minimum number of times, such as a minimum of 2 times whether or nor the assigned value is exceeded.

In another embodiment, the present invention may allow the displayed multiplier values for each wildcard symbol to exceed the assigned value, such as the appearance of predetermined symbol combination, wager amount, and/or at random.

In another embodiment, the present invention may increase the displayed multiplier values for each wildcard symbol at any pace, timing, and/or with any pause between increment, such as a long pause before a quick burst of increasing increments.

In another embodiment, the present invention may use the multiplier values to provide any type of awards, such as credits, free spins, award enhancements, prizes, products, and/or services.

In another embodiment, the present invention may use multiplier values to provide awards of any value, such as any number of credits, free spins, award enhancements, multipliers, prizes, products, and/or services.

In another embodiment, the present invention may indicate a wildcard symbol and/or multiplier values in any manner, including growing, shrinking, boxing, circling, outlining, glowing, flashing, blinking, and/or rotating the symbol.

In another embodiment, an event during a primary game triggers a secondary game using the present invention, including events such as symbol combinations, wager types or amounts, player selections, and/or at random.

In another embodiment, the present invention may be used as an optional game feature, such as a feature that is purchased with a supplemental wager by the player.

In another embodiment, an event during a primary game triggers a secondary game using the present invention, including events such as symbol combinations, wager types or amounts, player selections, and/or at random.

SCOPE & SPIRIT OF THE PRESENT INVENTION

The many features and advantages of the present invention are apparent from the descriptions of the preferred and alternative embodiments. The present invention, however, is not limited to these particular embodiments, as the invention is capable of being practiced and carried out in various ways. For example, new features may be added to an existing embodiment or features from two or more embodiments may be combined to produce a new embodiment. Further, features mentioned in any embodiment may be interchanged with similar features not mentioned that perform the same or similar functions. And, finally, the phraseology and terminology used to explain the embodiments are only descriptive and should not be regarded as limiting. The claims, therefore, seek to cover all features and advantages that fall within the true spirit and scope of the present invention.

We claim:

1. A method of playing a game using a symbol matrix formed by at least one row intersecting a plurality of columns, with the rows and columns including a plurality of symbols, comprising:

a. entering a wager into a slot machine to participate in the game and causing the slot machine to commence the game, the slot machine upon commencing the game automatically performing the following steps:

b. randomly rearranging the plurality of symbols;

c. displaying the rearranged symbols;

d. determining whether two or more wildcard symbols are used in winning symbol combinations and, if so, displaying multiplier values for each of said wildcard symbols in the following manner:

i. Assigning each wildcard symbol a multiplier value, V, from a range of values from 1 to N, such that 1=<V=<N;

ii. Displaying a multiplier value of 1 on each wildcard symbol;

iii. Selecting one of the wildcard symbols used in a winning combination at random and incrementing its displayed multiplier value by 1 from 1 to X, such that X<=V; and iv. Repeating step 1(d)(iii) until each wildcard symbol used in a winning symbol combination has increased from 1 to its assigned value, V;

e. enhancing the award for a winning symbol combination by the multiplier values displayed on wildcard symbols used in that combination; and f. issuing awards for all winning symbol combinations in the symbol matrix.

2. The method of claim 1 in which the award for a winning symbol combination is enhanced by the additive cumulative value of all multiplier values displayed on wildcard symbols used in a winning symbol combination.

3. The method of claim 1 in which the award for a winning symbol combination is enhanced by the multiplicative cumulative value of all multiplier values displayed on wildcard symbols used in a winning symbol combination.

4. The method of claim 1 in which the award for a winning symbol combination is enhanced by the highest multiplier value displayed on wildcard symbols used in a winning symbol combination.

5. The method of claim 1 in which the award for a winning symbol combination is enhanced by the lowest multiplier value displayed on wildcard symbols used in a winning symbol combination.

6. The method of claim 1 in which the award for all winning symbol combinations is enhanced by the additive cumulative value of all multiplier values displayed on wildcard symbols appearing in the symbol matrix.

7. The method of claim 1 in which the award for all winning symbol combinations is enhanced by the multiplicative cumulative value of all multiplier values displayed on wildcard symbols appearing in the symbol matrix.

8. The method of claim 1 in which the award for all winning symbol combinations is enhanced by the highest multiplier value displayed on wildcard symbols appearing in the symbol matrix.

9. The method of claim 1 in which the award for all winning symbol combinations is enhanced by the lowest multiplier value displayed on wildcard symbols appearing in the symbol matrix.

* * * * *